United States Patent [19]

Cameron

[11] 3,826,053
[45] July 30, 1974

[54] READILY ASSEMBLED JOINT

[76] Inventor: William R. Cameron, 4424 N.W. 13th St., Oklahoma City, Okla. 73107

[22] Filed: Jan. 19, 1972

[21] Appl. No.: 218,902

[52] U.S. Cl.................... 52/309, 52/586, 52/656, 52/753 K, 403/298
[51] Int. Cl............................................. F16b 7/04
[58] Field of Search...287/20.92 E, 20.92 K, 20.92 D, 287/20.92 C, 189.36 H; 52/584, 585, 586, 726, 309, 656; 403/294, 295, 298

[56] References Cited
UNITED STATES PATENTS

| | | | |
|---|---|---|---|
| 2,989,788 | 6/1961 | Kessler | 287/189.36 H |
| 3,113,354 | 12/1963 | Johnson | 287/189.36 H X |
| 3,284,113 | 11/1966 | Howell | 287/20.92 E |
| 3,510,985 | 5/1970 | Smits | 287/189.36 H X |
| 3,563,582 | 2/1971 | Shroyer | 287/20.92 E |
| 3,643,989 | 2/1972 | Sattler | 287/189.36 H |

Primary Examiner—James R. Boler
Assistant Examiner—Wayne L. Shedd
Attorney, Agent, or Firm—Dunlap, Laney, Hessin & Dougherty

[57] ABSTRACT

A fastening device for fastening or joining two pieces of relatively rigid material to each other. The fastening device includes a substantially monplanar base plate having projecting from each of the opposite sides thereof, a plurality of vanes arranged in two sets. The sets of vanes are spaced from each other, and individual vanes in each set are spaced from each other by a lesser distance than the spacing of the sets of vanes. Each of the vanes projects from the respective surface of the base plate at an angle of about 15° with respect to a plane extending normal to the base plate. The vanes are made of a deformable, relatively elastic material. The pieces or parts to be joined by the fastening device have slots formed in the facing surfaces at which the joint is to be located, and the fastening device is pressed into the slots by resilient deformation of the vanes of the fastening device.

1 Claim, 4 Drawing Figures

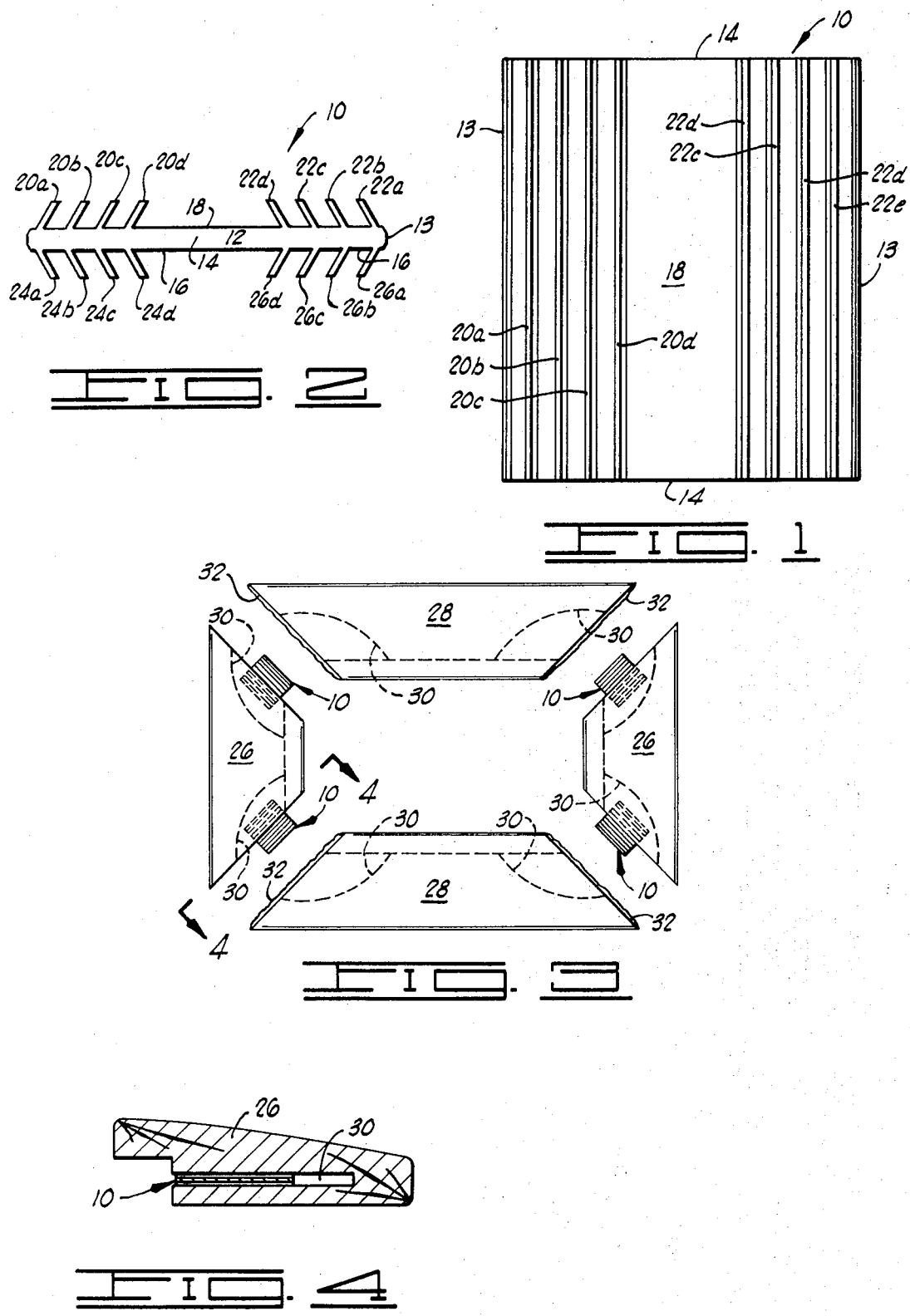

READILY ASSEMBLED JOINT

BACKGROUND OF THE INVENTION

1. Field of the Invention

This invention relates to fastening devices for use in joining contiguous pieces or parts so that the parts are not easily separated or displaced from each other. More particularly, but not by way of limitation, the invention relates to fastening devices which are useful in the field of wood-jointery where two pieces of wood are to be joined through a miter joint or other type of joint.

2. Brief Description of the Prior Art

Various types of fastening devices are presently being used for the purpose of joining two or more pieces of material in the construction of picture frames, door jambs, wooden furniture, window sashes and the like. The fastening devices have various geometric configurations and are made of various materials. Some of the devices in use depend upon the elastic deformation of some type of resilient material when opposite ends of the material are forced into slots or grooves formed in the facing or contiguous ends of the two pieces of material which are to be joined by the devices. In each case, any force tending to separate the pieces of materials thus joined is resisted by the interlock formed by the fastening device when in position.

BRIEF DESCRIPTION OF THE PRESENT INVENTION

The present invention relates to a fastening device which can be utilized in substantially any application where two pieces of material are to be joined to each other at a joint in which two faces or ends of the two pieces face each other, and are relatively near to each other.

Broadly described, the fastening devices of the invention each comprise a substantially monoplanar or flat base plate which has projecting from one or both of the opposite sides or surfaces thereof, a plurality of small, resiliently deformable vanes which are of a particular geometry, and are arranged in a particular manner with respect to each other and with respect to the base plate. The deformable vanes of the fastening device project outwardly from at least one of the surfaces of the base plate, and preferably from both surfaces thereof. The vanes are inclined, in each instance, toward the center line of the base plate and extend substantially parallel to each other. The degree of inclination of the several vanes is such that an angle of about 15° is formed by each vane with respect to a plane extended normal or perpendicular to the surface of the base plate from which the vane extends. The number of vanes which are employed is not particularly critical to the operation of the fastening device, and may be varied according to the requirements of the particular material joining operation which is to be carried out.

In a preferred embodiment of the invention, the vanes are arranged in two sets disposed on opposite sides of a center line extending transversely across the base plate. The vanes of each set are inclined in opposite directions with respect to each other (that is, the vanes in one set are inclined towards the center line, whereas the vanes in the set on the opposite sides of the center line are also inclined toward the center line and thus in the opposite direction from the vanes in the first set). The vanes in each set are spaced from each other by a distance such that spaces are provided to accommodate some deformation of each of the vanes upon application of a force tending to incline the respective vane further from a plane extending perpendicular to that surface of the base plate from which the respective vane projects. Also, the sets of vanes in the two sets are spaced from each other by a sufficient distance on opposite sides of the center line so that the vanes in the two sets which are located most nearly to each other, and to the center line of the base plate, can be deformed toward each other without coming into contact with each other, and thus interfering with the deformation of each other.

In an ancillary aspect, the present invention relates to the combination of the fastener devices of the invention, as hereinbefore described, with two pieces of wood which are to be joined at two facing, contiguous ends thereof, and particularly to miter joints formed between such two pieces of wood. The combination of the fastening devices with two pieces of material contemplates the formation of two slots in the facing ends of the pieces which are to be joined. Such slots are dimensioned to receive the vanes of the fastening device only when such vanes are deformed slightly in a direction such that the outer edges thereof are located more nearly to the base plate than in the relaxed, undeformed state of such vanes.

From the foregoing description of the invention, it will have become apparent that a primary object of the invention is to provide an improved fastening device which permits two or more pieces of relatively rigid material, whether of the same or dissimilar composition, to be joined at the location of two facing ends or contiguous surfaces of the pieces.

Another object of the invention is to provide a fastening device which reduces the amount of labor required for effecting the joinder of two pieces of relatively rigid material at adjacent end surfaces thereof.

An additional object of the invention is to reduce the skill, as well as the care, which must be exercised in effecting an aesthetic and satisfactory joinder of two pieces of relatively rigid material along a miter joint, such as in the formation of picture frames, window sashes and other structures.

Additional objects and advantages of the invention will become apparent as the following detailed description of the invention is read in conjunction with the accompanying drawings which illustrate the invention.

BRIEF DESCRIPTION OF THE DRAWINGS

FIG. 1 is a plan view of a fastening device constructed in accordance with the present invention.

FIG. 2 is an end view of the fastening device shown in FIG. 1.

FIG. 3 is a plan view illustrating parts of a picture frame being assembled utilizing the fastening device of the present invention.

FIG. 4 is a sectional view taken along line 4—4 of FIG. 3.

DETAILED DESCRIPTION OF A PREFERRED EMBODIMENT OF THE INVENTION

Referring initially to FIGS. 1 and 2 of the drawings, reference numeral 10 refers generally to the fastening device of the invention. The device includes a base plate 12 which is substantially monoplanar or flat in configuration, and may vary in its area and in the geometry of its outer periphery. In the illustrated embodiment of the invention, a typical fastening device is depicted in which the base plate has a side edge 13 of a length of about five-eighths inches, and a side edge 14 having a width of about one-half inch. The base plate of the illustrated embodiment of the invention is rectangular in shape, and has opposite monoplanar surfaces 16 and 18. Projecting from the surfaces 16 and 18 of the base plate 12 are a plurality of vanes which, in the illustrated embodiment, extend substantially parallel to each other. The vanes are grouped in sets, with one set of vanes extending from the surface 18 of the base plate being denominated generally by reference numeral 20. The individual vanes in the set 20 are indicated by reference numerals 20a, 20b, 20c and 20d. A second set of vanes extending from the surface 18 of base plate 12 is designated generally by reference character 22, and the individual vanes in this set are designated by reference numerals 22a, 22b, 22c and 22d. It will be noted that each of the vanes 20a–20d and 22a–22d is inclined with respect to a plane extending perpendicular to the surface 18 of the base plate, and that the inclination of each of the vanes is toward the center of the base plate. Preferably, the inclination of the vanes is such that an angle of about 15° is formed with respect to a plane extending perpendicular to the surface 18. It will further be noted that the vanes in the set 20 are inclined oppositely from the vanes in the set 22. The particular height and thickness of the several vanes may be varied according to the usage of the fastening device of the invention which is contemplated, and the considerations which will dictate the particular vane geometry and size will be better understood as the description of the invention proceeds.

The individual vanes within each of the sets 20 and 22 are spaced from each other by a distance sufficient to permit each of the vanes to be deformed inwardly toward the central portion of the base plate 12 when the fastening device is utilized. Each of the vanes in the sets 20 and 22 is made of a deformable material having a relatively high degree of elasticity so that, upon deformation of each individual vane toward the center line of the base plate 12, the individual vane is loaded in resilient deformation and exerts a force opposing the deforming force, and tending to return the vane to its illustrated relaxed or unstressed position. It will finally be noted that the most centrally located vanes in each of the sets 20 and 22—that is, the vane 20d in the case of the set 20, and the vane 22d in the case of the set 22—are spaced from each other by a greater distance than the spacing of contiguous individual vanes within each set. The greater spacing between the vanes 20d and 22d is provided to accommodate deformation of these two vanes in the opposite direction from each other or, considered differently, toward the central portion of the base plate 12 in the case of each of these oppositely inclined vanes.

Having described the particular geometry and relative arrangement of the vanes within the sets 20 and 22 which extend from the surface 18 of the base plate 12, it may now be pointed out that substantially identical sets of vanes 24 and 26 are disposed on the opposite surface 16 of the base plate 12, and are inclined and arranged in the same manner as those vanes already described. It may be noted that a preferred embodiment of the fastening device 10 of the invention contemplates the integral formation of the vanes 20a–20d and 22a–22d and base plate 12. In a preferred method of constructing the fastening devices, this is accomplished by extrusion molding techniques well known in the synthetic resin technology. It should be pointed out, however, that the invention is not considered as limited to this particular method of fabrication of the fastening devices 10 of the invention, and other methods which will be apparent to those skilled in the art can be used to advantage in some instances. Moreover, though a preferred embodiment of the invention contemplates the formation of the fastening device of a synthetic resin material, and most preferably, polypropylene, other materials such as rubber and metal may also be employed, and the particular properties of the material of construction may be varied to be more aptly suited to particular applications and uses of the fastening device. Where extrusion molding is utilized for forming the fastening device of the invention, the fabrication process may conveniently entail the extrusion of an elongated continuous strip having a cross-section similar to the edge view of the device shown in FIG. 2. The elongated continuous strip can then be cut into the proper shorter lengths to form the fastening devices needed for the particular application at hand.

The fastening devices as thus described are susceptible to utilization in a great many situations where it is desired to join two relatively rigid pieces of material to each other through any one of many types of joints currently utilized. Whatever the geometrical configuration of the object being assembled may be, the fastening device is usable to form a joint at any location where flat surfaces are to be mated and joined, the only requirement for usage being that the physical dimensions of the pieces of material to be joined are sufficiently large to accomodate slots for receiving the fastening device in the manner of usage hereinafter described.

In order to further illustrate the manner in which the fastening device of the invention is utilized, one application—the joining of the side members of regular picture frames through miter joints—will be described in detail. Most rectangular picture frames consist of four pieces of wood or other material, each of which is mitered on a 45° angle at each end thereof. In general, in the course of assembling such frames, glue is placed on the mitered ends of each of the four pieces, after which the various pieces are abutted in the proper rectangular configuration, and are held in this configuration in some type of holding fixture which applies oppositely acting forces to the joined pieces to hold them in abutting contact with each other while nails are driven into the joints, or while the glue is drying. The necessity to mount the mated and assembled pieces of the frame in a holding fixture requires a considerable labor factor. By the use of the fastening device of the present invention, the labor required to assemble such picture frames is substantially reduced. Moreover, the simplicity of the device and the ease with which it may be used, permit a relatively unskilled person to assemble an aesthetic rectangular frame in a relatively short time.

In using the fastening device of the invention for assembling a picture frame, four pieces of wood or other relatively rigid material are cut to the dimensions required in the frame, as is typically illustrated in FIG. 3. Two of the pieces 26 are, of course, cut to a length corresponding to the width of the frame, and two of the pieces 28 are cut to a length corresponding to the length of the frame. Each of the four pieces is then mitered on each end for a 45° angle. After the four pieces 26 and 28 have thus been formed, a slot 39 is cut in each end of each piece, using a router implement equipped with, for example, a 3/32 inch slotting cutter. The slot 30 which is cut in the mitered end of each piece is shown in FIG. 3 of the drawings by a dashed line, and also is shown in FIG. 4 of the drawings. The slot 30, in the example under consideration, is of a width, measured in a direction corresponding to the thickness dimension of the piece in which it is located, of 3/32 inch. The slot 30 will have a depth or distance of extension into the mitered end of the piece of about three-eighths inch at the point of maximum depth. It will be understood, of course, that the width of the slot 30 and its depth may be varied depending upon the physical dimensions of the material being joined and, in some instances, the particular usage which is to be made of the structure being assembled, and the forces to which it will be subjected tending to separate the joint.

After the four pieces 26 and 28 of the picture frame have been formed and slotted in the manner described, two of the pieces of equal length (that is, either two of the side pieces 26 or the top and bottom piece 28) are selected for the installation of the fastening devices 10. One fastener device 10 is pushed manually into the slot 30 formed in the end of each of these two pieces of material. This may be accomplished by holding each piece manually in one hand, and then forcing the fastening device 10 into the slot 30 formed in the end of the piece. This results in the vanes 20a–20d of each device 10 being deformed since, during the forcing of a portion of the fastening device into the slot, the vanes extend parallel to the mitered end of the piece in which the slot 30 is located.

In positioning the fastening device 10 in its respective receiving slot, the device is manually forced into the respective slot by a sufficient distance that approximately one-half of the width of the fastener is located in the slot, and the mitered end of the piece extends approximately along the center line of the base plate of the device. In pushing the fastening device 10 into the slot 30, some resistance to entry of the device into the slot will be felt. This is due to the fact that the overall height or thickness of the fastening device 10 is slightly greater than the width of the slot 30 which receives it, and the resistance is due to the necessity to deform the resilient vanes 20a–20d in order to force the device into the slot. It will be noted that the direction of vane deformation is toward the center line of the base plate 18 of the device, and that such vane deformation is accommodated by the spaces which are provided between adjacent vanes.

After the fastener devices 10 have been forced into their respective slots 30 in opposite ends of two of the pieces of the frame as shown in FIG. 3, withdrawal of the devices is extremely difficult because the deformable vanes then attempt to right themselves, and will bite into the boundary or defining surfaces of the slot in contact with the free outer edges of the several vanes. It is this biting action which constitutes the primary holding force developed by the fastening devices 10 of the invention.

After four of the fastening devices have been installed, one in each end of the two equal length pieces of material 26 constituting side pieces or end pieces of the frame, a liberal amount of a suitable adhesive or glue 32 is applied to the two opposite ends of each of the remaining two pieces 28 of material (that is, the two pieces which were not used to receive the four fastening devices). The four pieces of material 26 and 28 making up the frame are then arranged upon a flat surface. The two pieces 28 to which glue has been applied are then forced onto the projecting portion of the fastening devices 10 projecting from opposite ends of the two pieces in which they are located. Stated differently, the joints are then formed by pushing the pieces toward each other so that the exposed halves of the fastening devices 10 are forced into the slots 30 of the two remaining pieces 28. Thus, each fastening device 10 becomes engaged with two contiguous pieces of the frame through the mitered joint at each corner thereof. The relatively large spacing or clearance area which is provided between the most centrally located vane in each of the sets 20–22 of vanes will, at this time, permit these two oppositely inclined vanes in the paired sets to be deformed toward each other without coming in contact, and thus interfering with the deformation of each other.

Having assembled the frame in the manner described, any excess glue or adhesive is wiped away, and the frame is then permitted to lie on the flat surface on which it has been assembled to permit the glue to set up. However, due to the immediate joinder afforded by the use of the fastening devices of the invention, the frame may immediately be placed in service should this be desirable. The setting up time may be permitted to occur without the necessity for using some type of holding or clamping instrumentality, and without the use of nails or other unsightly securing devices. In this regard, it will be noted that the fastening devices of the invention permit such nailing, clamping, or installation and holding fixtures, to be either entirely eliminated or substantially reduced.

Other applications of the fastening device of the invention will come readily to mind since the operating principles thereof have been explained. It is possible, for instance, to construct the fastening devices of the invention from polypropylene with a sufficient cross-sectional thickness and overall size and area such that the device can be used in the manufacture of pre-hung door units in the housing and mobile home industries. In this case, the fastening device would not only serve to provide a waterproof, weathertight holding fixture, but due to the inherent resiliency of the polypropylene, could function as the hinge for such door. Here, the center clearance area or spacing between opposed sets of vanes on the base plate of the fastening device would be sufficiently large to accommodate one-half of the thickness of the trailing edge of the door (or permit the door to open easily without destruction of the fastening device), and the number and size of the vanes would be such as to provide maximum holding power and strength.

Although a preferred embodiment of the invention has been herein described, it will be apparent that the basic principles underlying the invention may be extended to a variety of sizes and shapes of fastening devices, and to such devices made of many materials of construction. The devices may be employed for fastening together relatively rigid pieces of material of the same or different composition. The particular shape and position of the deformable vanes, the number thereof, and the cross-sectional configuration of the fastener are subject to wide variation, provided only that the general principles of resilient deformation and reverse setting of the vanes after the fastening device has been positioned in the receiving slots are contemplated within the spirit and scope of the invention. All changes and innovations of the various types contemplated which continue to rely upon such basic principles are therefore deemed to be circumscribed by the spirit and scope of the invention except as the same may be necessarily limited by the appended claims or reasonable equivalents thereof.

What is claimed is:

1. A joint comprising:
   a first rigid member having an end face with a slot extending into said first rigid member from said end face;
   a second rigid member having an end face with a slot extending into said second rigid member from the end face thereof; and
   a fastening device extending into the slots in said first and second members, said fastening device comprising:
      a base plate having a pair of parallel, substantially monoplanar surfaces, and further having
         a first portion including parts of said opposed monoplanar surfaces and projecting into the slot in said first member; and
         a second portion including parts of said opposed monoplanar surfaces projecting into the slot in said second member; and
      a plurality of spaced, resilient, elongated, parallel vanes projecting outwardly from each of said monoplanar surfaces on said first and second portions of said base plate and projecting into biting engagement with each of said first and second members, said vanes each being inclined at an acute angle with respect to a plane extending normal to said base plate, and said vanes being arranged in two sets projecting from each of said opposed substantially monoplanar surfaces, with the vanes in one set projecting from one of said monoplanar surfaces engaging one of said rigid members and being inclined in the direction of the vanes in the other set extending from said one monoplanar surface and engaging the other of said rigid members, said two sets of vanes on each of said monoplanar surfaces being spaced from each other, and the vanes in each of the sets projecting from each one of said monoplanar surfaces being inclined in the opposite direction from the vanes in the other of said sets of vanes mutually projecting from said one monoplanar surface, said base plates and vanes being integrally formed of synthetic resin as a unitary member.

* * * * *